W. B. READY.

Gang Plow.

No. 2,991. Reissued June 16, 1868.

Inventor
W. B. Ready

Witnesses
R. Riddle
A. K. Kipps

By J. H. Atkinson
Atty

N. PETERS, Photo-Lithographer, Washington, D. C.

UNITED STATES PATENT OFFICE.

WILLIAM B. READY, OF SACRAMENTO, CALIFORNIA.

IMPROVEMENT IN GANG-PLOWS.

Specification forming part of Letters Patent No. 33,851, dated December 3, 1861; Reissue No. 2,991, dated June 16, 1868.

*To all whom it may concern:*

Be it known that I, WILLIAM B. READY, of Sacramento, in the county of Sacramento and State of California, have invented a new and Improved Gang-Plow; and I do hereby declare that the following is a full, clear, and exact description of the same, reference being had to the annexed drawings, making a part of this specification, in which—

Figure 1:
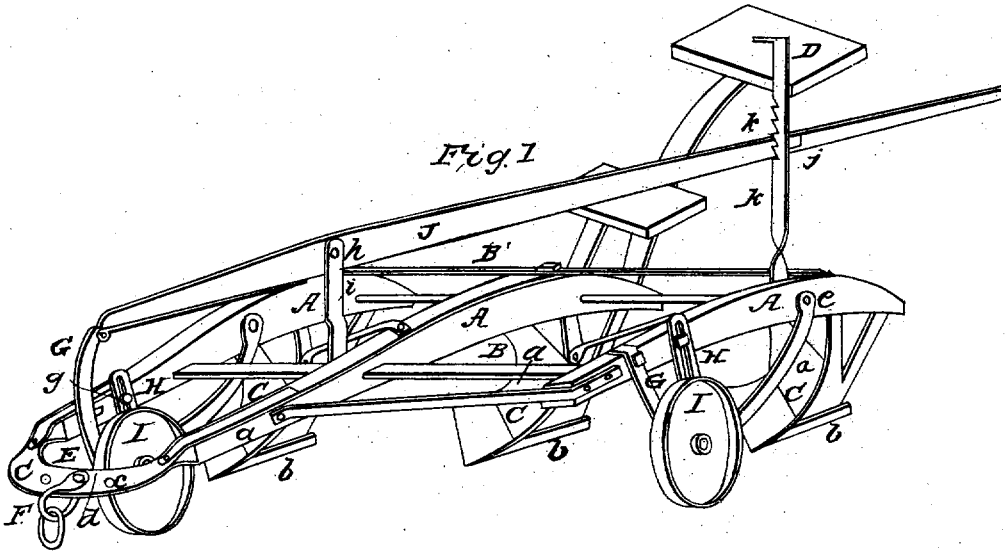
Figure 2:
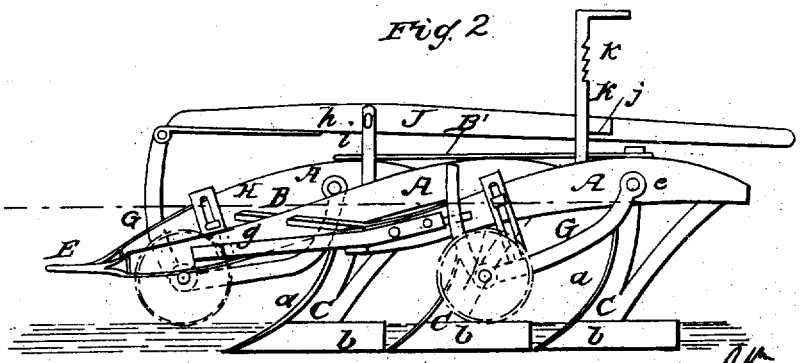

Figure 1 is a perspective view of my invention, and Fig. 2 a side sectional view of the same.

Similar letters of reference indicate corresponding parts in the several figures.

The object of this invention is to obtain a gang-plow of simple construction, which will be of lighter draft than usual, and capable of being readily gaged to plow or form furrows of geater or less depth, as may be desired, and the plows also readily thrown up free from the ground, when required, as in turning at the ends of furrows, and in transporting the machine from place to place.

To enable those skilled in the art to fully understand and construct my invention, I will proceed to describe it.

A A A represent three beams, which are of curved form, their front ends extending or projecting down considerably lower than their back ends. These beams are connected by transverse bars B B B, and each beam has a plow, C, attached, having a mold-board, *a*, and landside *b*, as usual. The plows C have positions one a little in advance of the other, so that the slice turned by the first plow will be properly lapped or joined by that turned by the second, and the slice turned by the second plow lapped or joined by that turned by the third.

At the back end of the central beam A there is placed the driver's seat D, and the central beam A projects as far forward as the right-hand one, and both of said beams are connected at their front ends by a plate, E, which is perforated with holes *c*, any one of which receives the bolt *d* of a clevis, F.

To the outer beams A A there are secured two bent arms, G G, one to each beam. These arms are secured at their back ends to the beams A A by means of screws *e e*, and the arms are allowed to work freely on said screws. The front part of the arms G G works in guides *f*, attached to the beams A.

To each outer beam A, to its outer side, there is attached a slotted plate or bar, H. These plates or bars are secured to the beam by set-screws *g*, and they may be adjusted higher or lower by means of the slots and set-screws. The plates or bars H serve as gages, and determine the position of wheels I I, which are attached one to each arm G, for the arms G bear against the plates H. The position of the wheels I determines the depth of the plows C in the ground, as will be readily seen by referring to Fig. 2. The higher the wheels are adjusted the greater the depth of penetration of the plows, and vice versa, the arms G being in contact with the lower edges of the plates or bars H. The wheels I insure the furrows being made of uniform depth as they move along over the surface of the ground, and cause the plows to conform to the undulations or irregularities thereof.

To the right-hand arm G of the device there is attached a lever, J. This lever has its fulcrum at *h*, at the top of an upright, *i*, which is attached to the central beam A. The lever extends back past the driver's seat D, and has a plate, *j*, attached, which may be fitted on any of a series of teeth, *k*, on a vertical bar, K, which is secured to the left-hand beam A.

At any time when it is necessary to elevate the plows C above the ground, the driver, from his seat D, raises the back of the lever J, and thereby elevates the points of the plows, which will pass out of the ground.

The curved form of the beams A is an important feature of the invention, for it throws the strain or "pull" down near the earth and lessens the draft of the implement.

The object and purposes of the crooked beam A and the connecting-plate E are to arrange and apply the draft at such point or place as may be desired in any manner and at any point below a horizontal line, with the top of the standard of the plow, as shown in red dotted lines in the drawings, according to the condition of the ground to be operated upon; also, to diminish the power necessary to be applied.

Having thus described my invention, what

I claim as new, and desire to secure by Letters Patent, is—

1. The curved beams A, when used in connection with a gang-plow, or a series of plows connected together by cross-bars B B B, constructed and operated as and for the purposes herein set forth.

2. The arrangement of the arms G, wheels I, and lever J, when attached to the right-hand arms G, and connected to the central beam A, as and for the purposes set forth.

WILLIAM B. READY.

Witnesses:
SAMUEL CROSS,
C. T. G. SALLE.